3,662,053
PROCESS FOR COATING DIRECTLY VINYLIDENE CHLORIDE LATEX ON VINYL CHLORIDE RESIN MOLDINGS
Shinsuke Yoshikawa, Akira Yamamoto, and Masashi Kumasaka, Iwaki-shi, Japan, assignors to Kureha Kagaku Kogyo Kabushiki Kaisha, Tokyo, Japan
No Drawing. Filed July 1, 1970, Ser. No. 51,698
Claims priority, application Japan, July 1, 1969, 44/51,463
Int. Cl. B32b 27/08
U.S. Cl. 264—129
13 Claims

ABSTRACT OF THE DISCLOSURE

A process for coating a vinyl chloride resin molding with a vinylidene chloride latex which comprises coating said molding immediately after molding said molding at a temperature of from 100 to 230° C. and while said molding is at its melting temperature, is disclosed.

BACKGROUND OF THE INVENTION (1) Field of the invention

The present invention relates to a process for coating a vinylidene chloride latex directly on vinyl chloride resin moldings.

(2) Description of the prior art

The demand for vinyl chloride resins recently has increased markedly in the fields of package materials, containers, and the like. However, the use of a vinyl chloride resin alone is accompanied with various disadvantages, such as in moisture permeability, gas permeability, oil resistance, chemical resistance, and the like, a method is employed for overcoming such difficulties in which the vinyl chloride resin is coated with a vinylidene chloride resin and such will be expected to increase as the demand increases for the resin in future. In this case, hitherto it has been considered difficult to coat a vinylidene chloride latex directly on vinyl chloride resin moldings because (1) a vinyl chloride resin molding is not a porous material as is paper and wood,
(2) the difference in the solubility parameter between the vinyl chloride resin and the vinylidene chloride resin is large, and
(3) a vinylidene chloride resin is a crystalline resin.

In fact, when a vinylidene chloride latex is coated on a vinyl chloride resin, similar to coating on paper and the like, and thereafter the coated product is heated to temperatures near the melting point of the vinylidene chloride resin, the vinylidene chloride resin appears completely adhered to the vinyl chloride resin. However, when the temperature of the resin is decreased and crystallization of vinylidene chloride resin occurs, it is clear that the vinylidene chloride coating is scarcely adhered to the vinyl chloride resin.

Accordingly, in coating a vinylidene chloride latex on a vinyl chloride molding, a method has hitherto been employed in which a vinylidene chloride latex is coated on the vinyl chloride resin molding after applying an anchor coat of a primer, such as a polyurethane resin or an ethylene-vinyl acetate resin to the vinyl chloride resin molding.

Thus, an object of the present invention is to provide a process for coating a vinylidene chloride resin latex directly on vinyl chloride resin moldings without using the above-described primer.

SUMMARY OF THE INVENTION

The present invention is a process for coating a vinylidene chloride latex, which does not adhere directly to a vinyl chloride resin molding using a conventional coating method at normal temperatures, directly to a vinyl chloride resin molding by applying the latex to the vinyl chloride resin molding directly after molding when the vinyl chloride resin is at the melting temperature. It has been discovered that by using the above procedure the vinylidene chloride latex, astonishingly, is adhered strongly to the vinyl chloride resin molding.

DETAILED DESCRIPTION OF THE INVENTION

The term "vinyl chloride resin moldings" as used in the description of this invention means moldings of polyvinyl chlorides or a resin mainly comprising a copolymer of more than 80%, by weight, of vinyl chloride and at least one monomer selected from the group consisting of vinyl acetate, propylene, ethylene, and an alkyl vinyl ether. Moreover, the vinyl chloride resin moldings of this invention can contain, if desired, from 0 to 45% by weight of additives, for example, plasticizers, such as dioctylphthalate, BPBG, dibutylsebacate, epoxidized soya bean oil, and the like, workability-modifying agents such as alkyl esters of polymethacrylic acid in which the alkyl group has from 1 to 8 carbon atoms, and assistants for impact resistance, such as butadiene-acrylonitrile-styrene copolymers, butadiene-methylmethacrylate-styrene copolymers, ethylene-vinyl acetate copolymers, and chlorinated polyethylenes, for improving the workability, softness, and impact resistance of the moldings.

The adhesion of the vinylidene chloride latex is effective when the vinyl chloride resin moldings are soft blends or hard blends and is influenced very little by the types of stabilizers, such as lead, tin, cadmium, barium, magnesium, zinc, and calcium compounds, and the like.

The term "vinylidene chloride latex" as used in the description of the present invention means a latex prepared by copolymerizing more than 50% by weight of vinylidene chloride and one or more monomers which are copolymerizable with vinylidene chloride.

Examples of suitable monomers for copolymerization with vinylidene chloride are, vinyl chlorides, alkyl acrylates in which the alkyl group has from 1 to 8 carbon atoms, alkyl methacrylates in which the alkyl group has from 1 to 8 carbon atoms, and acrylonitriles.

The vinylidene chloride latex can be coated using dip coating, various roll coatings, and the like, according to the end use and where the vinyl chloride resin is molded at a molding temperature of from 100° to 250° C. by extrusion molding or calender molding, the above described coating method is particularly preferred.

Moreover, in addition to the above-described improvements in properties, by the direct coating of the vinylidene chloride latex to vinyl chloride resin moldings, a heat seal can be applied easily.

Thus, the vinylidene chloride latex coated vinyl chloride resin can be utilized in numerous fields, for example, packages for foods, chemicals, and the like, and laminated sheets of vinyl chloride resin and paper, cloth, aluminum foil, board, mortar, and the like. In particular, humidity proof and gas proof sheets, capable of being subjected to vacuum molding, are expected to be utilized as vessels or containers.

EXAMPLE 1

A polyvinyl chloride, having a polymerization degree ($\overline{P}$) of 700 and having the following composition:

| | Parts |
|---|---|
| Vinyl chloride ($\overline{P}$=700) | 90 |
| BTA–II* | 10 |
| Tin-type stabilizer | 6 |
| Lubricant | 1 |

*A butadiene-styrene-methylmethacrylate resin made by Kureha Chemical Industry Co.

was extruded through a T-die at a die temperature of 170° C. to provide a sheet of 3 mm. in thickness.

Before solidifying the sheet thus formed with cooling, a vinylidene chloride resin latex containing about 50% by weight of a copolymer resin consisting of 40% by weight vinyl chloride and 60% by weight vinylidene chloride was applied to the sheet in a thickness of 3 g./m.$^2$ by means of a roll coater.

After cooling the sheet, an adhesive tape having a width of 20 mm. was adhered to the sheet in a length of about 5 cm. The adhesive tape then was pulled away by pulling a part of the tape but no change in the coating was observed.

A sheet having coated thereon vinylidene chloride as prepared in Example 1 and the same kind of sheet having no such vinylidene chloride coating was molded by using a vacuum molding machine after preheating the sheets to 130° C. to provide cups having a volume of 100 cc.

The cups thus formed were filled with anhydrous calcium chloride and after closing the tops of the cups with aluminum foil, the cups were placed in a chamber at 40° C. and 90% relative humidity. Thereafter, the amount of water absorbed by the calcium chloride was measured by determining the calcium chloride weight increase. The results are shown in Table I.

TABLE I

| | Weight increase of CaCl$_2$ (mg./24 hrs.) |
|---|---|
| No coating | 60 |
| Coating of vinylidene chloride | 25 |

As can be seen from the above table, the cup formed using the sheet of this invention showed excellent humidity resistance.

EXAMPLE 2

A polyvinyl chloride, having a polymerization degree of 800 and having the following composition:

| | Parts |
|---|---|
| Vinyl chloride ($\overline{P}$=800) | 90 |
| HC–825 L* | 5 |
| Plasticizer (dioctyl phthalate) | 5 |
| Cd-Ba composite stabilizer | 1.5 |
| Lead stearate | 0.5 |
| Epoxy resin stabilizer | 2 |

*Vinyl chloride-vinyl ether copolymer resin made by the Kureha Chemical Industry Co.

was subjected to calender roll molding at a roll temperature of 180° C. to provide a sheet of 0.2 mm. in thickness.

Before solidifying the sheet thus formed, a vinylidene chloride resin latex containing about 50% by weight of a copolymer resin consisting of 30% by weight of vinyl chloride and 70% by weight of vinylidene chloride was applied to the sheet at a thickness of 4 g./m.$^2$ using a roll coater.

After cooling, the sheet thus coated was subjected to the adhesive tape test, described in Example 1, but no change was observed in the coating.

EXAMPLE 3

A polyvinyl chloride having a polymerization degree of 700 was used to prepare a blend having the following composition:

| | Parts |
|---|---|
| Vinyl chloride ($\overline{P}$=700) | 90 |
| BTA–III | 10 |
| Organotin-type stabilizer | 6 |
| Lubricant | 1 |

A mixture having the above composition was formed into a tubular parison having an outer diameter of 30 mm., an inner diameter of 25 mm., and a length of 25 cm. using extrusion molding at a die temperature of 185° C.

Immediately after extruding the parison, a vinylidene chloride resin latex containing 48% by weight of a copolymer consisting of 90% by weight of vinylidene chloride and 10% by weight of methyl methacrylate was coated on the inside surface of the parison thus formed to provide Sample A. On the other hand, comparison Sample B having no such coating of the latex was also prepared using the above procedure.

The total amount of the vinylidene chloride resin coated on the inside surface of Sample A was one gram. The adhesivity of the coating was excellent, as in Examples 1 and 2.

After preheating Samples A and B to 180° C., each one was inserted into a metal mold and molded into a bottle of 500 cc. in volume and 70 mm. in diameter under an air pressure of 0.7 kg./cm.$^2$.

A piece, 0.5 mm. in thickness, was cut from the body of the bottle and the humidity permeability thereof was tested at 40° C. and 90% in relative humidity, using the ASTM-E-90 procedure. The results obtained are shown in Table II.

TABLE II

| | Humidity permeability (g./m.$^2$, 24 hrs.) |
|---|---|
| Sample A | 0.5 |
| Sample B | 1.5 |

Sample A has excellent humidity resistance as shown in Table II.

COMPARISON EXAMPLE

A T-die sheet (uncoated), prepared by the same manner as in Example 1, was once cooled and coated with a vinylidene chloride resin latex as used in Example 1 and dried at about 120° C. When the coated sheet was subjected to an adhesive tape test, as described in Example 1, the coating adhered to the adhesive tape and was stripped from the vinyl chloride sheet.

Also, when the drying temperature was increased further, for example, when the sheet thus coated was dried at about 150° C., the vinyl chloride sheet deteriorated and when the sheet was bent, the sheet was cracked readily and deformed to form wrinkles. Furthermore, in this case, the coating was readily stripped using the adhesive tape test.

What is claimed is:

1. A process for coating a molded vinyl chloride resin article with a vinylidene chloride latex which comprises coating said molded vinyl chloride resin article immediately after molding said article with said vinylidene chloride latex at a temperature of from 100 to 230° C. and while said molded vinyl chloride resin article is at its melting temperature.

2. A process as claimed in claim 1, wherein said molded vinyl chloride resin article is a vinyl chloride resin sheet.

3. A process as claimed in claim 1, wherein said molded vinyl chloride resin article is a tubular parison.

4. A process as claimed in claim 1 wherein said vinyl chloride resin is a homopolymer of vinyl chloride or a copolymer of at least 80%, by weight, of vinyl chloride with a monomer selected from the group consisting of vinyl acetate, propylene, ethylene and an alkyl vinyl ether.

5. A process as claimed in claim 1 wherein said vinylidene chloride latex comprises a latex prepared by copolymerizing at least 50% by weight of vinylidene chloride with at least one monomer copolymerizable with said vinylidene chloride.

6. A process as claimed in claim 5 wherein said monomer copolymerizable with said vinylidene chloride is selected from the group consisting of vinyl chloride, alkyl acrylates, alkyl methacrylate and acrylonitriles, wherein said alkyl group has from 1 to 8 carbon atoms.

7. A process as claimed in claim 1, wherein said molded vinyl chloride resin article is molded at a temperature of from 100 to 250° C. by extrusion molding.

8. A process as claimed in claim 1, wherein said molded vinyl chloride resin article is molded at a temperature of from 100 to 250° C. by calender molding.

9. A process as claimed in claim 1 wherein said vinyl chloride resin further contains from 0 to 45% by weight, based on the weight of vinyl chloride resin, of an impact-resistance additive selected from the group consisting of butadiene-acrylonitrile-styrene copolymers, butadiene-methylmethacrylate-styrene copolymers, ethylene-vinyl acetate copolymers and chlorinated polyethylenes.

10. A process as claimed in claim 1 wherein said vinyl chloride resin further contains from 0 to 45% by weight, based on the weight of vinyl chloride resin, of a plasticizer selected from the group consisting of dioctylphthalate, dibutylsebacate and epoxidized soya bean oil.

11. A process as claimed in claim 1 wherein said vinyl chloride resin further contains from zero to 45% by weight, based on the weight of vinyl chloride resin, of a workability-modifying agent comprising an alkyl ester of polymethacrylic acid wherein the alkyl group has from 1 to 8 carbon atoms.

12. A process as claimed in claim 1 wherein said vinyl chloride resin is a copolymer of about 90 parts by weight vinyl chloride and about 10 parts by weight of a butadiene-styrene-methyl methacrylate copolymer.

13. A process as claimed in claim 1 wherein said vinyl chloride resin is a copolymer of about 90 parts by weight of vinyl chloride and about 10 parts by weight of a vinyl chloride-vinyl ether copolymer.

References Cited
UNITED STATES PATENTS

| | | | |
|---|---|---|---|
| 2,897,100 | 7/1959 | Grenley et al. | 117—138.8 |
| 3,057,752 | 10/1962 | Royals et al. | 117—119.2 |
| 3,108,017 | 10/1963 | Messwarb et al. | 117—138.8 |
| 3,124,476 | 3/1964 | Park et al. | 117—47 |
| 3,257,482 | 6/1966 | Schechter | 264—98 X |
| 3,532,535 | 10/1970 | Bleyle et al. | 117—161 X |

WILLIAM D. MARTIN, Primary Examiner

T. G. DAVIS, Assistant Examiner

U.S. Cl. X.R.

117—94, 138.8 UA, 161 H, UN, UC; 264—98